(12) United States Patent
Sato et al.

(10) Patent No.: US 8,227,374 B2
(45) Date of Patent: Jul. 24, 2012

(54) EXHAUST GAS PURIFICATION CATALYST

(75) Inventors: Noboru Sato, Shizuoka (JP); Tomohito Mizukami, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 160 days.

(21) Appl. No.: 12/447,580

(22) PCT Filed: Oct. 31, 2007

(86) PCT No.: PCT/JP2007/071592
§ 371 (c)(1), (2), (4) Date: Apr. 28, 2009

(87) PCT Pub. No.: WO2008/054017
PCT Pub. Date: May 8, 2008

(65) Prior Publication Data
US 2010/0062930 A1    Mar. 11, 2010

(30) Foreign Application Priority Data

Oct. 31, 2006  (JP) ................................ 2006-296447

(51) Int. Cl.
| | |
|---|---|
| *B01J 23/00* | (2006.01) |
| *B01J 23/38* | (2006.01) |
| *B01J 23/40* | (2006.01) |
| *B01J 23/42* | (2006.01) |
| *B01J 23/44* | (2006.01) |
| *B01J 23/46* | (2006.01) |

(52) U.S. Cl. ........ 502/339; 502/100; 502/300; 502/325; 502/349

(58) Field of Classification Search .................. None
See application file for complete search history.

(56) References Cited

U.S. PATENT DOCUMENTS

| | | | | |
|---|---|---|---|---|
| 4,843,056 | A | * | 6/1989 | Matsumoto et al. .......... 502/302 |
| 5,294,421 | A | * | 3/1994 | Muraki et al. ............. 423/239.1 |
| 2001/0031699 | A1 | * | 10/2001 | Matsumoto et al. .......... 502/303 |
| 2005/0170953 | A1 | | 8/2005 | Shirahata et al. |

FOREIGN PATENT DOCUMENTS

| | | |
|---|---|---|
| JP | 60-19036 A | 1/1985 |
| JP | 6-170234 A | 6/1994 |
| JP | 7-60117 A | 3/1995 |

OTHER PUBLICATIONS

Masashi Honda (Authourized Officer) International Search Report PCT/JP2007/071592, Japanese Patent Office, Jan. 15, 2008 (date of completion), Jan. 29, 2008 (date of mailing search report) 1 page.
Gregory S. Sims and Sandeep Johri, SAE Technical Paper Series, title: Catalyst Performance Study Using Taguchi Methods; Oct. 10-13, 1988 pp. 1-9, vol. 881589,General Motors Corp.

* cited by examiner

*Primary Examiner* — Melvin C Mayes
*Assistant Examiner* — Colin W Slifka
(74) *Attorney, Agent, or Firm* — Millen, White, Zelano & Branigan, P.C.

(57) ABSTRACT

The invention provides an exhaust gas purification catalyst comprising one or more catalyst coating layers having platinum and/or palladium with rhodium supported on a carrier, characterized in that the (platinum and/or palladium)/rhodium weight ratio is 1.0 or less.

3 Claims, No Drawings

EXHAUST GAS PURIFICATION CATALYST

TECHNICAL FIELD

The present invention relates to a novel exhaust gas purification catalyst with enhanced exhaust gas purification performance and especially NOx purification performance.

BACKGROUND ART

Exhaust gas purification catalysts which are three-way catalysts obtained by coating noble metals such as platinum, rhodium and palladium onto porous metal oxide carriers such as γ-alumina, are used for efficient purification of noxious gas components, HC, CO, NOx and the like emitted from internal combustion engines.

In light of tighter worldwide emission control in recent years, it has become more difficult to conform to emission control of HC, CO and NOx, and particularly of HC immediately after start-up and NOx after warm-up. Moreover, among the noble metals mentioned above, the use of platinum or rhodium which are dwindling and expensive resources must be reduced from the viewpoint of resource conservation and cost reduction.

In order to prevent loss of catalyst performance due to deterioration (sintering) of noble metals or reduction of catalyst heat resistance due to alloying of different noble metals, it has been common in the prior art to utilize highly heat-resistant support materials as a measure against noble metal deterioration, but only limited improvement in exhaust gas purification performance has been achieved by restricting noble metal usage, and alternative views for catalyst specifications and noble metal configurations are being proposed.

DISCLOSURE OF THE INVENTION

The weight ratio of platinum to rhodium in conventional exhaust gas purification catalysts is usually 20:1-2:1, and therefore platinum has been used in greater amounts than rhodium (Gregory S Sims, et al., "Catalyst Performance Study Using Taguchi Methods" SAE Technical Paper Series, 881589, Oct. 10-13, 1988). However, the present inventors have significantly reduced the usual amount of platinum with respect to rhodium and have discovered that increased exhaust gas purification performance and especially NOx purification performance is achieved as a result, and it is upon this discovery that the present invention has been completed. Rhodium catalysts containing no platinum and/or palladium as catalyst components can also be employed in order to reduce platinum usage, but research by the present inventors has also shown that the purification performance of such catalysts is inadequate.

According to a first aspect, the present invention provides an exhaust gas purification catalyst comprising a carrier base material, and one or more catalyst coating layers formed on the carrier base material and containing a porous oxide carrier and platinum and/or palladium with rhodium, characterized in that the (platinum and/or palladium)/rhodium weight ratio is 1.0 or less.

According to a second aspect, the invention further provides an exhaust gas purification system provided with an exhaust gas purification catalyst which comprises a carrier base material, and one or more catalyst coating layers formed on the carrier base material and containing a porous oxide carrier and a noble metal, wherein when two or more catalyst coating layers are formed on the same carrier base material, the second or more catalyst coating layers in the direction of the exhaust gas flow, or wherein when two or more catalysts are loaded, any catalyst coating layer of the second or more catalysts contains (platinum and/or palladium)/rhodium at a weight ratio of 1.0 or less.

According to the present invention, it is possible to efficiently purify NOx after warm-up, and, depending on the position where the invention is provided, even NOx during cold start. The exhaust gas purification catalyst of the invention not only reduces platinum or palladium usage but can also reduce the amount of rhodium used therewith, and is therefore favorable in terms of cost reduction. In particular, significant reduction in platinum and palladium is possible according to the invention. Moreover, the platinum reduction can reduce alloying of platinum with other catalyst metals, and especially alloying with rhodium, thus also avoiding reduction in heat resistance of the catalyst.

BEST MODE FOR CARRYING OUT THE INVENTION

Exhaust Gas Purification Catalyst

In the first aspect, the present invention provides an exhaust gas purification catalyst comprising a carrier base material, and one or more catalyst coating layers formed on the carrier base material and containing a porous oxide carrier and platinum and/or palladium with rhodium, characterized in that the (platinum and/or palladium)/rhodium weight ratio is 1.0 or less.

The exhaust gas purification catalyst of the invention comprises platinum and/or palladium and rhodium as catalyst metals supported on a porous oxide carrier, in a catalyst coating layer formed on a carrier base material. The carrier base material may have a straight flow structure with honeycomb passageways, a foam structure, or a pellet structure, and the material to used may be any one which can be employed in the prior art for exhaust gas purification catalysts, for example a heat resistant ceramic such as cordierite, or a metal. From the viewpoint of dispersed loading of the catalyst component, it is preferably a porous form such as a honeycomb structure formed of a material such as cordierite.

The porous oxide carrier may be a porous oxide, such as γ- or θ-alumina, titania, zirconia, ceria or silica, or a complex oxide composed of several compounds selected from the foregoing. From the viewpoint of enhanced exhaust gas purification performance, the complex oxide preferably has a high zirconium content, and specifically the complex oxide preferably contains over 50 wt % zirconium, and more preferably 60-95 wt % zirconium.

The porous oxide carrier may also contain additional porous complex oxides other than the aforementioned porous complex oxide with a high zirconium content. In such cases, when cerium is included in the additional porous complex oxide within a range that does not adversely affect performance, the content may be greater than that of zirconium in terms of weight ratio.

The term "porous complex oxide" as used herein refers not to simple mixtures (composites) of the aforementioned porous oxides, but to partial solid solutions of the constituent elements of other porous oxides in certain porous oxide structures caused by heat treatment or the like. There are no particular restrictions on the method of forming the complex oxide, and a known method may be employed.

The (platinum and/or palladium)/rhodium ratio in the catalyst coating layer is 1.0 or less, and is preferably 0.01-0.5. The amount of rhodium may be an amount ordinarily employed in catalysts. However, the properties of the catalyst of the invention allow the amount of rhodium to be reduced to 0.05 g and even 0.01 g per 1 L of catalyst volume. The upper limit for the amount of rhodium is not particularly restricted, and may be 0.5 g or even 1.0 g per 1 L of catalyst volume. In consideration of obtaining sufficient NOx purification performance and cost efficiency, the amount of rhodium used for the invention is preferably about 0.2 g per 1 L of catalyst volume.

The catalyst coating layer according to the invention can be formed on the carrier base material by loading platinum and/or palladium with rhodium on the porous oxide carrier, using a conventional method such as impregnation, wash coating or the like. Depending on the purpose, the catalyst coating layer may also contain another catalyst metal, or an NOx storage material such as an alkali metal or alkaline earth metal. The catalyst coating layer may also consist of multiple layers instead of a monolayer, and its thickness is not specifically limited.

As one example, the catalyst of the invention may be produced by repeating a process that comprises immersing the carrier base material in a coating solution slurry containing the catalyst components, carrier, etc. to adsorb the coating solution onto the carrier base material surface, and then drying and firing it. The method of the present invention is not specifically limited to the above-mentioned method, however, and for example, the catalyst component may first be loaded on the carrier and then a slurry containing them coated onto the carrier base material.

Exhaust Gas Purification System

The exhaust gas purification catalyst of the invention as described above exhibits particularly high purification performance for exhaust gas with a low NOx content. Therefore, if the catalyst is located downstream from a conventionally used three-way catalyst, it is possible to further purify NOx that has been left unpurified by means of conventional exhaust gas purification systems. Thus, according to a second aspect of the invention there is provided an exhaust gas purification system provided with an exhaust gas purification catalyst, wherein when two or more catalyst coating layers are formed on the same carrier base material, the second or more catalyst coating layers in the direction of the exhaust gas flow, or wherein when two or more catalysts are loaded, any catalyst coating layer of the second or more catalysts contains (platinum and/or palladium)/rhodium at a weight ratio of 1.0 or less. In a preferred embodiment, the catalyst of the invention is located in an exhaust gas purification system as an underfloor catalyst.

In another embodiment, when the catalyst of the invention is situated in a start converter, it may be located downstream from a conventional exhaust gas purification catalyst. Also, for the exhaust gas purification catalyst that is furthest upstream in the start converter, the carrier base material may be divided into multiple zones in the direction of the exhaust gas flow, with the catalyst composition in the upstream (front end) zone having the same catalyst composition as a conventional three-way catalyst and the catalyst composition in the downstream (rear end) zone having the proportion specified above (zone coated catalyst). In this case, the downstream end is the zone of 10-90%, preferably 20-60% and most preferably up to 50% of the total length of the carrier base material from the end of the catalyst outlet toward the inlet.

The present invention will now be explained in greater detail by the following examples. However, it is to be understood that the invention is not limited to these examples.

EXAMPLES

Example 1

Preparation of Monolayer Underfloor Catalyst (Catalyst Components: Rhodium and Platinum)

A slurry was prepared by mixing a rhodium nitrate solution (rhodium content: 0.15 g) and a dinitrodiaminoplatinum solution (platinum content: 0.01 g) with 90 g of θ-alumina and 70 g of a cerium/zirconium complex oxide (cerium:zirconium=20:80 (weight ratio)). The slurry was used for immersion coating of a monolith honeycomb (volume: 1 L), which was subsequently dried at 250° C. for 1 hour. It was then fired at 500° C. for 1 hour to prepare a monolayer underfloor catalyst (Example 1) with a catalyst coating layer having the following composition (platinum/rhodium (g/g)=0.07).

Monolayer: 0.15 g rhodium, 0.01 g platinum, 90 g θ-alumina, 70 g cerium/zirconium complex oxide (cerium:zirconium=20:80 (weight ratio)).

Examples 2-5

Preparation of Monolayer Underfloor Catalysts (Catalyst Components: Rhodium and Platinum)

Following the same procedure as in Example 1, underfloor catalysts were prepared having monolayers with (platinum and/or palladium)/rhodium (g/g) ratios of 0.10-1.00 as listed in Table 1 below, in order to investigate different platinum amounts (Examples 2-5).

Example 6

Preparation of Monolayer Underfloor Catalyst (Catalyst Components: Rhodium and Palladium)

A monolayer underfloor catalyst (Example 6) having a catalyst coating layer with the following composition was prepared by the same procedure as Example 1, except that a palladium nitrate solution (palladium content: 0.03 g) was used instead of the dinitrodiaminoplatinum solution (palladium/rhodium (g/g)=0.20).

Monolayer: 0.15 g rhodium, 0.03 g palladium, 90 g θ-alumina, 70 g cerium/zirconium complex oxide (cerium:zirconium=20:80 (weight ratio)).

Example 7

Preparation of Monolayer Underfloor Catalyst (Catalyst Components: Rhodium and Platinum)

A monolayer underfloor catalyst (Example 7) having a catalyst coating layer with the following composition was prepared by the same method as Example 1, except that 20 g of a second complex oxide (Ce/Zr(55:45)) was added to the slurry (platinum/rhodium (g/g)=0.20).

Monolayer: 0.15 g rhodium, 0.03 g platinum, 90 g θ-alumina, 70 g first cerium/zirconium complex oxide (cerium:zirconium=20:80 (weight ratio)), 20 g second cerium/zirconium complex oxide (cerium:zirconium=55:45 (weight ratio)).

Example 8

Preparation of Two-layered Underfloor Catalyst (Catalyst Components: Rhodium and Platinum)

A slurry was prepared containing a dinitrodiaminoplatinum solution (platinum content: 0.03 g) and 45 g of θ-alumina. The slurry was used for immersion coating of a monolith honeycomb (volume: 1 L), which was then dried at 250° C. for 1 hour.

Next, a slurry was prepared by mixing a rhodium nitrate solution (rhodium content: 0.15 g), 45 g of θ-alumina and 70 g of a cerium/zirconium complex oxide (cerium:zirconium=20:80 (weight ratio)). The slurry was used for further immersion coating of the coated monolith honeycomb, and this was dried at 250° C. for 1 hour. It was then fired at 500° C. for 1 hour to prepare a two-layered underfloor catalyst (Example 8) with a catalyst coating layer having the following composition (platinum/rhodium (g/g)=0.20).

Upper layer: 0.15 g rhodium, 45 g θ-alumina, 70 g cerium/zirconium complex oxide (cerium:zirconium=20:80 (weight ratio)), lower layer: 0.03 g platinum, 45 g θ-alumina.

Comparative Example 1

Preparation of Monolayer Underfloor Catalyst (Catalyst Components: Rhodium and Platinum)

A monolayer underfloor catalyst (Comparative Example 1) having a catalyst coating layer with the following composition was prepared by the same method as Example 1 (platinum/rhodium (g/g)=3.33).

Monolayer: 0.15 g rhodium, 0.50 g platinum, 90 g θ-alumina, 70 g cerium/zirconium complex oxide (cerium:zirconium=20:80 (weight ratio)).

Comparative Example 2

Preparation of Monolayer Underfloor Catalyst (Catalyst Components: Rhodium and Platinum)

A monolayer underfloor catalyst (Comparative Example 2) having a catalyst coating layer with the following composition was prepared by the same method as Example 1 (platinum/rhodium (g/g)=2.00).

Monolayer: 0.15 g rhodium, 0.30 g platinum, 90 g θ-alumina, 70 g cerium/zirconium complex oxide (cerium:zirconium=20:80 (weight ratio)).

Comparative Example 3

Preparation of Monolayer Underfloor Catalyst (Catalyst Component: Rhodium)

A monolayer underfloor catalyst (Comparative Example 3) having a catalyst coating layer with the following composition was prepared by the same method as Example 1, except that no dinitrodiaminoplatinum solution was used.

Monolayer: 0.15 g rhodium, 90 g θ-alumina, 70 g cerium/zirconium complex oxide (cerium:zirconium=20:80 (weight ratio)).

The compositions of the catalysts of Examples 1-8 and Comparative Examples 1-3 are listed in Table 1.

TABLE 1

| Catalyst | Coating layer | Pt (g) | Pd (g) | Rh (g) | (Pt + Pd)/Rh | θ-alumina (g) | Ce/Zr(20:80) (g) | Ce/Zr(55:45) (g) |
|---|---|---|---|---|---|---|---|---|
| Example 1 | Single layer | 0.01 | | 0.15 | 0.07 | 90 | 70 | |
| Example 2 | Single layer | 0.02 | | 0.15 | 0.10 | 90 | 70 | |
| Example 3 | Single layer | 0.03 | | 0.15 | 0.20 | 90 | 70 | |
| Example 4 | Single layer | 0.10 | | 0.15 | 0.67 | 90 | 70 | |
| Example 5 | Single layer | 0.15 | | 0.15 | 1.00 | 90 | 70 | |
| Example 6 | Single layer | | 0.03 | 0.15 | 0.20 | 90 | 70 | |
| Example 7 | Single layer | 0.03 | | 0.15 | 0.20 | 90 | 70 | 20 |
| Example 8 | Top layer | | | 0.15 | 0.20 | 45 | 70 | |
| | Bottom layer | 0.03 | | | | 45 | | |
| Comp. Ex. 1 | Single layer | 0.50 | | 0.15 | 3.33 | 90 | 70 | |
| Comp. Ex. 2 | Single layer | 0.30 | | 0.15 | 2.00 | 90 | 70 | |
| Comp. Ex. 3 | Single layer | | | 0.15 | — | 90 | 70 | |

Measurement of Purification Performance

Each catalyst was subjected to endurance exercise in a 4 L cylinder capacity engine for 50 hours at a catalyst-entering gas temperature of 850° C. and then mounted in an actual-use vehicle with a 2.2 L cylinder capacity engine (in an underfloor exhaust pipe). A two-layered start converter catalyst (platinum/rhodium (g/g)=8.0) with a catalyst coating layer having the following constitution was mounted in the start converter of a vehicle.

Upper layer: 0.25 g rhodium, 70 g θ-alumina, 70 g cerium/zirconium complex oxide (cerium:zirconium=20:80 (weight ratio)).

Lower layer: 2.00 g platinum, 40 g θ-alumina, 80 g cerium/zirconium complex oxide (cerium:zirconium=55:45 (weight ratio)).

The vehicle was run with the operating mode set to LA #4 mode, and the NOx, NMHC and CO emission effect of each catalyst was measured. The results are shown in Table 2 below.

TABLE 2

| Catalyst | Total (mg/mile) | | | bag1 (mg/mile) | | | bag2 (mg/mile) | | | bag3 (mg/mile) | | |
| --- | --- | --- | --- | --- | --- | --- | --- | --- | --- | --- | --- | --- |
| | NOx | NMHC | CO | NOx | NMHC | CO | NOx | NMHC | CO | NOx | NMHC | CO |
| Example 1 | 36 | 32 | 649 | 33 | 30 | 596 | 1 | 2 | 38 | 2 | 1 | 15 |
| Example 2 | 32 | 33 | 648 | 29 | 31 | 594 | 1 | 1 | 40 | 2 | 1 | 14 |
| Example 3 | 32 | 30 | 602 | 30 | 28 | 543 | 1 | 2 | 42 | 1 | 1 | 17 |
| Example 4 | 35 | 30 | 604 | 31 | 28 | 550 | 2 | 1 | 39 | 2 | 1 | 15 |
| Example 5 | 38 | 32 | 607 | 33 | 30 | 554 | 3 | 2 | 38 | 2 | 1 | 15 |
| Example 6 | 33 | 29 | 616 | 29 | 26 | 560 | 2 | 2 | 40 | 2 | 1 | 16 |
| Example 7 | 36 | 29 | 599 | 29 | 26 | 541 | 4 | 2 | 40 | 3 | 1 | 18 |
| Example 8 | 33 | 33 | 615 | 31 | 30 | 561 | 1 | 2 | 39 | 1 | 1 | 15 |
| Comp. Ex. 1 | 43 | 29 | 593 | 35 | 27 | 550 | 3 | 1 | 31 | 5 | 1 | 12 |
| Comp. Ex. 2 | 44 | 30 | 599 | 36 | 28 | 549 | 4 | 1 | 36 | 4 | 1 | 14 |
| Comp. Ex. 3 | 40 | 38 | 677 | 36 | 33 | 602 | 2 | 2 | 58 | 2 | 3 | 17 |

As seen in Table 2, the catalysts of Examples 1-5 exhibited improved NOx purification performance compared to the catalysts of Comparative Examples 1 and 2 which comprised catalyst coating layers with high platinum contents. It was also found that the NOx emission value was significantly reduced when palladium was used instead of platinum (Example 6) at a low content as with platinum. On the other hand, when rhodium was used as the only catalyst component without platinum (Comparative Example 3), the results were inferior not only in NOx emission value but also in purification performance, compared to the catalysts of the invention. Furthermore, the invention exhibited a reduced NOx emission value even with a two-layered mode (Example 8).

Industrial Applicability

According to the invention it is possible to provide a catalyst with improved exhaust gas purification performance compared to conventional exhaust gas purification catalysts.

What is claimed is:

1. An exhaust gas purification catalyst comprising a carrier base material, and one or more catalyst coating layers formed on the carrier base material and containing a porous oxide carrier and platinum and/or palladium with rhodium, characterized in that the (platinum and/or palladium)/rhodium weight ratio is 0.01 to 0.05 and the amount of rhodium is 0.01 to 0.05 g per liter of catalyst volume.

2. An exhaust gas purification catalyst according to claim 1, wherein the porous oxide carrier includes a porous complex oxide containing over 50 wt % zirconia.

3. An exhaust gas purification system provided with an exhaust gas purification catalyst comprising a carrier base material, and one or more catalyst coating layers formed on the carrier base material and containing a porous oxide carrier and a noble metal, wherein (a) two or more catalyst coating layers are formed on the same carrier base material, the second or more catalyst coating layers in the direction of the exhaust gas flow contains (platinum and/or palladium)/rhodium at a weight ratio of 0.01 to 0.05, and the amount of rhodium is 0.01 to 0.05 g per liter of catalyst volume, or (b) two or more catalysts are loaded, and any catalyst coating layer of the second or more catalysts contains (platinum and/or palladium)/rhodium at a weight ratio of 0.01 to 0.05, and the amount of rhodium is 0.01 to 0.05 g per liter of catalyst volume.

* * * * *